United States Patent [19]

Kawaguchi

[11] Patent Number: 5,179,392
[45] Date of Patent: Jan. 12, 1993

[54] MULTI-COLOR IMAGE FORMING APPARATUS

[75] Inventor: Toshikazu Kawaguchi, Toyokawa, Japan

[73] Assignee: Minolta Camera Co., Ltd., Osaka, Japan

[21] Appl. No.: 681,325

[22] Filed: Apr. 4, 1991

[30] Foreign Application Priority Data

Apr. 5, 1990 [JP] Japan .................................. 2-90630
Nov. 19, 1990 [JP] Japan .................................. 2-315243

[51] Int. Cl.$^5$ .............................................. H04N 1/21
[52] U.S. Cl. .................................... 346/108; 355/207
[58] Field of Search ................ 346/108, 160; 358/296, 358/298, 300; 355/205, 202, 245

[56] References Cited

U.S. PATENT DOCUMENTS 4,819,019 4/1989 Egawa et al. ...................... 355/244
4,939,548 7/1990 Yamada et al. ..................... 355/245

FOREIGN PATENT DOCUMENTS 58-79215 5/1983 Japan .
60-20319 10/1985 Japan .
61-61585 12/1986 Japan .

*Primary Examiner*—Mark J. Reinhart
*Attorney, Agent, or Firm*—Price, Gess & Ubell

[57] ABSTRACT

A multi-color image forming apparatus forming an image of a plurality of colors in one processing by using a plurality of laser beams and a plurality of developing devices, in the case where any of the laser beams becomes unusable during forming a mono-color image, makes the image data to have been outputted from the laser beam to be replaced by that of another laser beam which can be usable, then to output it. The apparatus, in the case where any of the laser beams and developing devices become unusable because of trouble caused therein during forming an image of a plurality of colors, forms an image as an emergency measure by using the remaining usable laser beams or developing devices. Moreover, in the case where any of the laser beams and developing devices for any color become unusable because of trouble caused therein during forming an image of a plurality of colors, express the color by changing the density of another color.

28 Claims, 14 Drawing Sheets

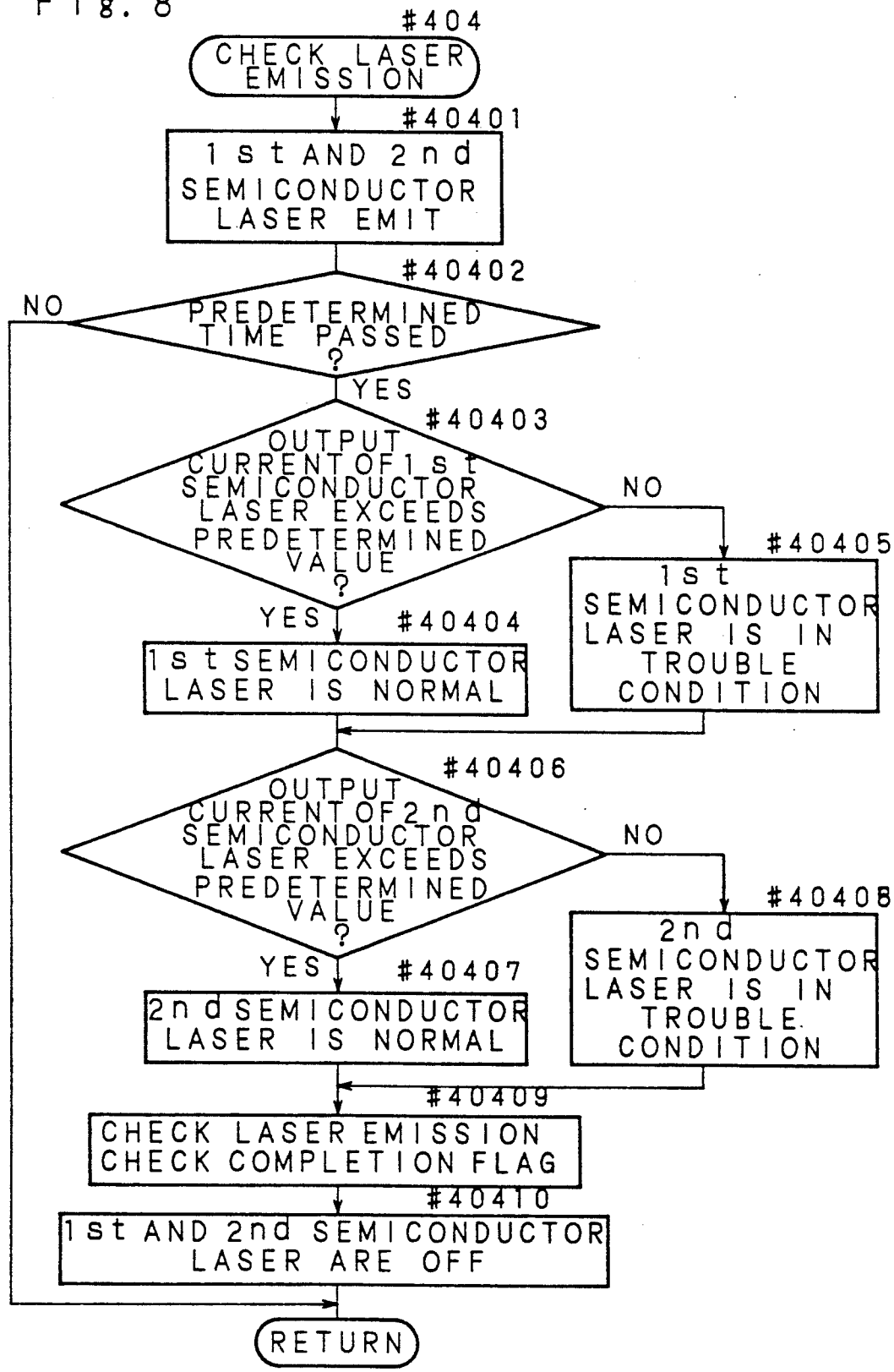

Fig. 9

| 2nd LASER | 1st LASER | 2nd DEV. | 1st DEV. | PROCESSING CONTENTS AND DEVICES FOR USE | STEP No. |
|---|---|---|---|---|---|
| NORMAL | NORMAL | NORMAL | NORMAL | AS IT IS | |
| NORMAL | NORMAL | NORMAL | EMPTY | MONO-COLOR DENSITY CONVERSION 2nd LASER & 1st DEV. | 427 |
| NORMAL | NORMAL | EMPTY | NORMAL | MONO-COLOR DENSITY CONVERSION 1st LASER & 1st DEV. | 425 |
| NORMAL | NORMAL | EMPTY | EMPTY | TROUBLE | 422 |
| NORMAL | TROUBLE | NORMAL | NORMAL | MONO-COLOR DENSITY CONVERSION 2nd LASER & 1st DEV. | 421 |
| NORMAL | TROUBLE | NORMAL | EMPTY | MONO-COLOR DENSITY CONVERSION 2nd LASER & 1st DEV. | 421 |
| NORMAL | TROUBLE | EMPTY | NORMAL | TROUBLE | 422 |
| NORMAL | TROUBLE | EMPTY | EMPTY | TROUBLE | 422 |
| TROUBLE | NORMAL | NORMAL | NORMAL | MONO-COLOR FROM FIRST, 1st laser / TWO-COLOR FROM FIRST, MONO-COLOR DENSITY CONVERSION 1st LASER & 2nd DEV. | 415–417 |
| TROUBLE | NORMAL | NORMAL | EMPTY | MONO-COLOR DENSITY CONVERSION 1st LASER & 2nd DEV. | 414 |
| TROUBLE | NORMAL | EMPTY | NORMAL | MONO-COLOR DENSITY CONVERSION 1st LASER & 1st DEV. | 411 |
| TROUBLE | NORMAL | EMPTY | EMPTY | TROUBLE | 412 |
| TROUBLE | TROUBLE | NORMAL | NORMAL | TROUBLE | 412 |
| TROUBLE | TROUBLE | NORMAL | EMPTY | TROUBLE | 412 |
| TROUBLE | TROUBLE | EMPTY | NORMAL | TROUBLE | 412 |
| TROUBLE | TROUBLE | EMPTY | EMPTY | TROUBLE | 412 |

MULTI-COLOR IMAGE FORMING APPARATUS

BACKGROUND OF THE INVENTION

1. Field of the Invention

The present invention relates to a multi-color image forming apparatus using multiple beams in digital copying machines, laser beam printers, and the like.

2. Description of the Related Art

Conventionally, as a multi-color image forming apparatus, a device to modulate two laser beams in accordance with the image data and irradiate to different portions in the circumferential direction of the photosensitive drum, repeat charging and developing with respective positions in between, and form a two-color image in one rotation of the photosensitive drum is well known.

In this type of a color image forming apparatus, developing device containing color toners other than black such as red or blue are generally located at upstream side of the developing device containing a black toner with respect of the rotating direction of the photosensitive drum. This is because the black toner, when colors are mixed, exhibits a marked color contamination. In this type of color-image forming apparatus, the image data to output laser beams to be irradiated downstream said is delayed with respect to that upstream side considering the rotating time of the photosensitive drum to each irradiation position in order to align the multiple colors of the image formed on the photosensitive drum.

In this type of color-image forming apparatus, in the case where the laser source as an exposing means which exposes the photosensitive drum and/or developing devices which feeds toners to the latent image on the photosensitive drum formed by exposing become inoperable, the apparatus becomes incapable for forming images. In such event, a specialist engineer must be consulted to repair the inoperable irradiator and/or developing devices.

However, even in the case where a specialist engineer is consulted, the apparatus with inoperable irradiator and/or developing devices cannot form images until the repairing is completed, and the image-forming apparatus must be shut down. Consequently, frequent occurrence of the inoperable condition as described above generates a problem of marked decrease in the image-forming efficiency.

SUMMARY OF THE INVENTION

The present invention has been realized in the light of these conditions, and the primary object of the present invention is to provide a multi-color image forming apparatus that can form emergency images by allowing other operable exposing means to act for the inoperable exposing means and output the information which should be outputted by the inoperable exposing means.

Another object of the present invention is to provide a multi-color image-forming apparatus which can form emergency images using the remaining operable exposing means or developing means in the case where any trouble occurs in any of the exposing means or developing means and it becomes unavailable during multi-color image forming.

Still another object of the present invention is to provide an apparatus which can identify formed images easily by a color density difference and can obtain the images with high visibility as well as forming emergency images without shutting down the apparatus and improving the image-forming efficiency by expressing the failed color by varying the density of other colors even in the case where any of the color exposing means or developing means becomes unavailable during multi-color image forming operation.

The multi-color image forming apparatus according to the present invention comprising an image holding medium which holds an electrostatic latent image formed thereon; image exposing means which have multiple light emitting sources for irradiating beams according to the image data of specified colors including density information, irradiate the beams on a plurality of portions on the image holding medium, and form latent images on the respective portions according to each color; a plurality of developing means which contain developers of different colors and develop a plurality of electrostatic latent images formed by the image exposing means on the image holding medium; development trouble detecting means which detect trouble occurring at each one of the multiple developing means; an image data conversion means which converts to the density information of other density the image data density information corresponding to the beams which form an electrostatic latent image to be developed by the developing means when trouble of at least one of the plurality of developing means is detected by a trouble detecting means; an image data composing means which composes the image data density-converted by the image data conversion means and the image data which is not density-converted; and an image forming means which forms an electrostatic latent image on the image holding medium based on the image data composed by the image data composing means and develops the formed electrostatic latent image with a developing means in which no trouble has been detected by the development trouble detecting means.

The above and further objects and features of the invention will more fully be apparent from the following detailed description with accompanying drawings.

BRIEF DESCRIPTION OF THE DRAWINGS

FIG. 8 is a flow chart showing the processing content of the laser emission check sub routine of the print processing sub routine;

FIG. 9 is a table summarizing the processing contents with respect to the 16 combinations of first and second semiconductor lasers and first and second developing device conditions of the print processing sub routine;

DESCRIPTION OF THE PREFERRED EMBODIMENTS

Referring now to the preferred embodiments, the present invention will be described in detail hereinafter.

Figure 1:
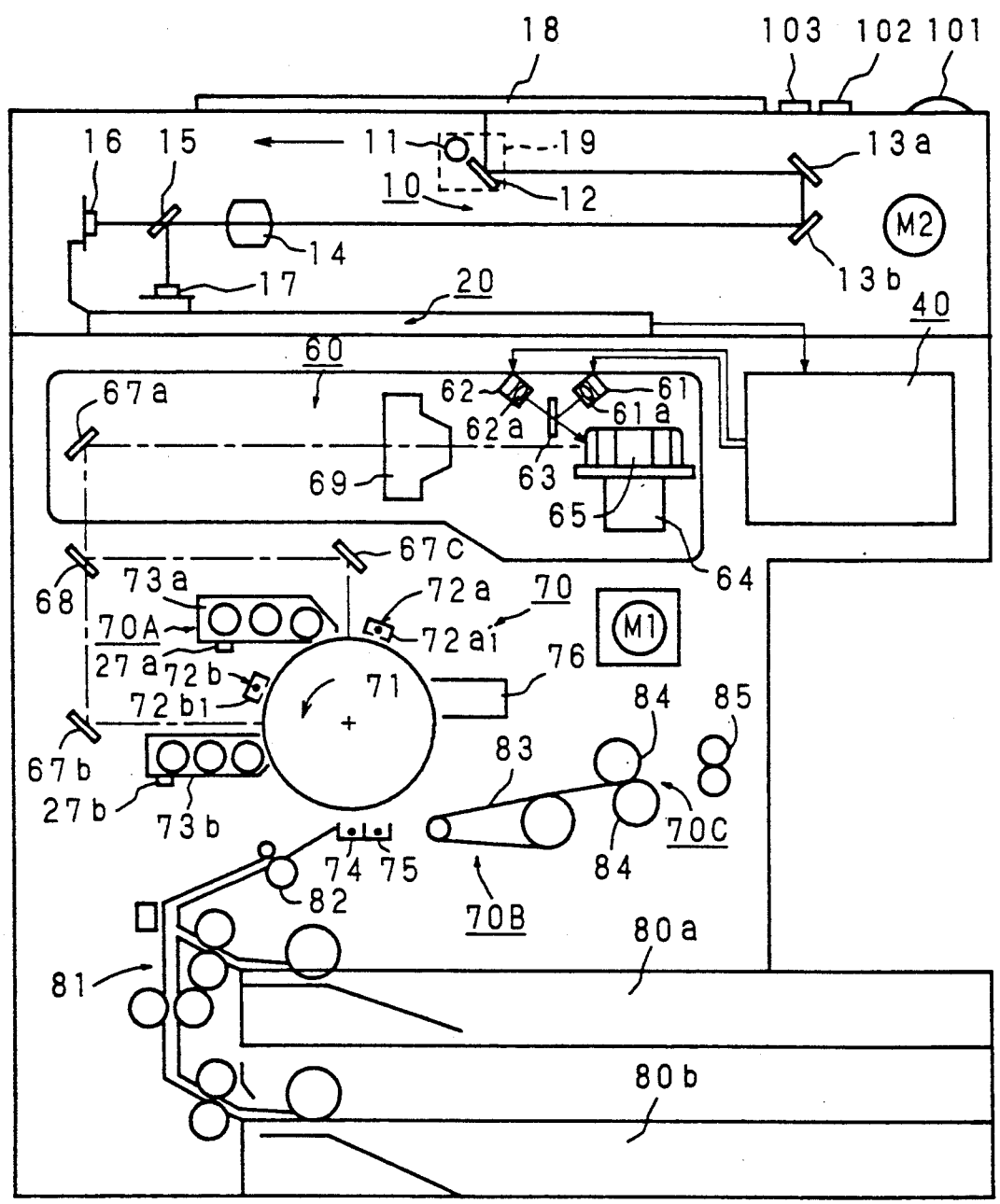
FIG. 1 is a typical side cutaway view showing a configuration of a two-color copying machine as one embodiment of the multi-color image forming apparatus according to the present invention.

FIG. 1 is a typical side cutaway view showing a configuration of a two-color copying machine as one embodiment of the multi-color image forming apparatus according to the present invention.

The copying machine of the present embodiment is of a type which develops the image by reversal development and is provided with a scanning system 10 which scans the original, an image signal processing unit 20 which processes the image signals sent from the scanning system 10, a print processing unit 40 which outputs the image data to two semiconductor lasers (first semiconductor laser 61, second semiconductor laser 62) later described in accordance with the processed image signals, an optical system 60 which irradiates two modulated beams based on the image data to the photosensitive drum 71, and an image-forming system 70 which develops a latent image formed on a photosensitive drum 71 by irradiation of the modulated beams, transfers and fuses the image on a paper as transfer body.

The scanning system 10 exposes and scans the original placed on a copy table glass 18 and converts the reflected lights to electrical signals by photoelectric conversion elements 16, 17 using, for example, a CCD array. The photoelectric conversion elements 16, 17 convert the image of a specific color such as, for example, red and the image of other colors such as black into electric signals, respectively.

The scanning system 10 is installed to a scanner 19 which moves parallel to the original table glass 18. The scanning system 10 consists of an exposure lamp 11 which irradiates the original, a reflecting mirror 12 which deflects the direction of the reflected light from the original, two mirrors 13a, 13b which deflect the light path from the reflecting mirror 12, a lens 14 which condenses the reflection light, a half mirror 15 which reflects and transmits the reflected light according to the wavelength thereof and divides into two light paths, and photoelectric conversion elements 16, 17 which generate electrical signals in accordance with the light received from respective paths divided by the half mirror 15.

The scanning system 10 exposes and scans the original when the scanner 19 moves, to the left direction shown with an arrow in FIG. 1.

The image signal processing unit 20 receives the image signals outputted from the two photoelectric conversion elements 16, 17, and processes not only usual image processing such as shading correction, varying magnitude, dither processing, but also identifying the signals as the specific color (red in this embodiment) and as the color other than that (black in this embodiment), and outputting them to the print processing unit 40 as image data with two-color information and 8 bit (256 gradations) density information.

The print processing unit 40 allots the image date sent from the image signal processing unit 20 to either the first semiconductor laser 61 or the second semiconductor laser 62 according to the color information and density information attached thereto. The print processing unit 40 delays the image data provided to the second semiconductor laser 62 in accordance with the difference of the exposing position on the photosensitive drum 71 of the first semiconductor laser 61 and the second semiconductor laser 62.

The optical system 60 forms electrostatic latent images corresponding to the red image, the specific color, and the black image, the color other than the specific color, respectively, on the photosensitive drum 71 by the laser beams from the first semiconductor laser 61 and the second semiconductor laser 62.

Figure 2:
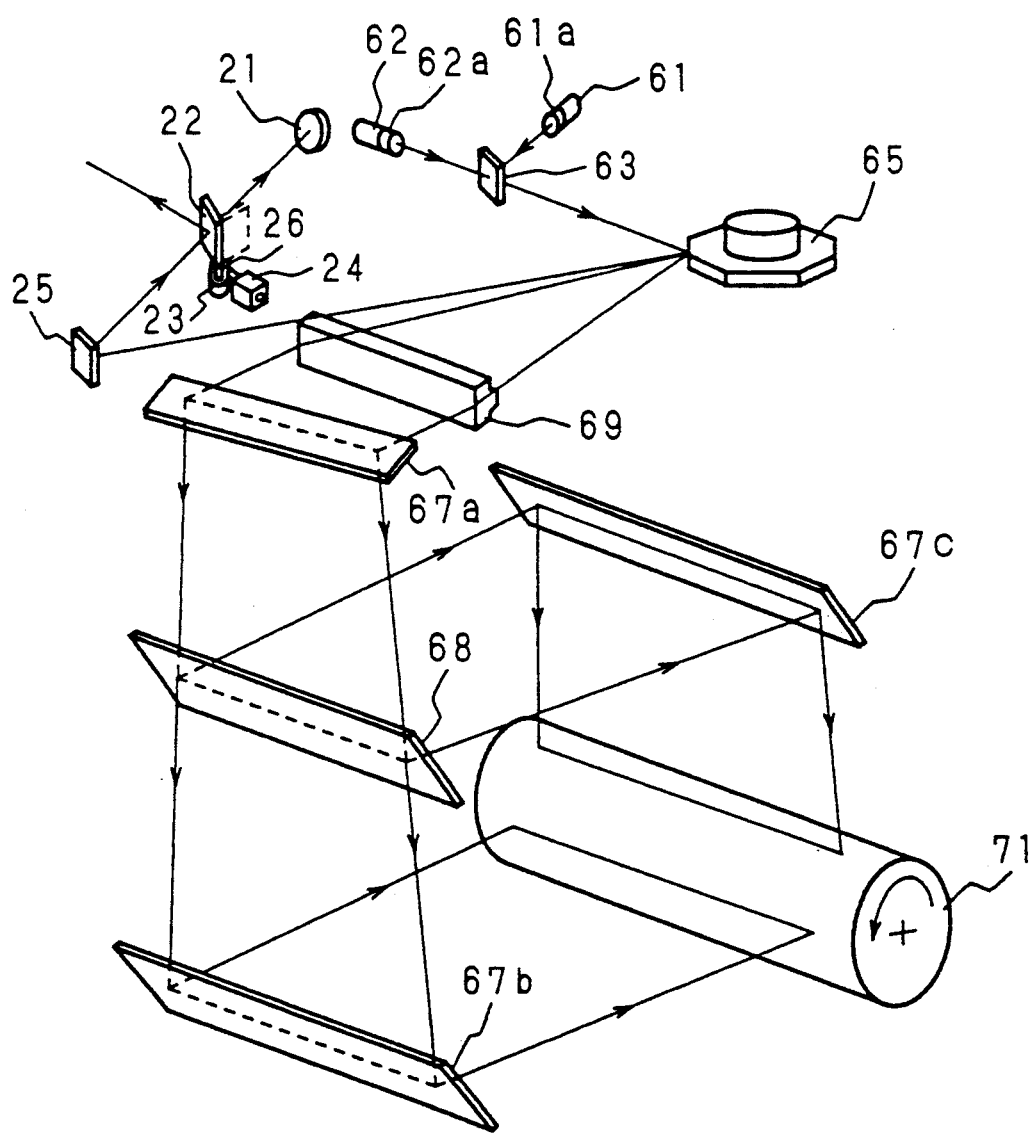
FIG. 2 is an enlarged view as seen obliquely; showing a configuration of the main portion of the optical system of a two-color copying machine as one embodiment of the multi-color image forming apparatus according to the present invention.

FIG. 2 is an enlarged view as seen obliquely, showing a configuration of the main portion of the optical system 60 of a two-color copying machine as one embodiment of the multi-color image forming apparatus according to the present invention.

The optical system 60 consists of the first semiconductor laser 61 which emits laser beams of 750 nm wavelength and the second semiconductor laser 62 which emits laser beams of 810 nm wavelength, collimator lenses 61a, 62a which convert the laser beams radiated by the first semiconductor laser 61 and the second semiconductor laser 62, respectively, to the parallel beams, a composing mirror 63 which composes two laser beams with a dichroic mirror which reflects one of the two laser beams and allow another one to pass through according to the wavelengths, a polyon mirror 65 which deflects the composite laser beam to the main scanning direction, a condensing lens 69 which condenses the deflected laser beams, a mirror 67a which reflects the condensed laser beams, a separating mirror 68 which has the characteristics same as those of the composing mirror 63 and reflects and allows the composite laser beam to pass through and separates them into two laser beams, and reflecting mirrors 67b, 67c which reflects the separated laser beams to the direction of the photosensitive drum 71.

The composite laser beam reflected by the polygon mirror 65 is incided also into the reflecting mirror 25 directly and the reflected beams incided into the separating mirror 22 using the dichroic mirror with the characteristics same as those of the composing mirror 63. The laser beams being incided into the separating mirror 22 are separated or allowed to pass through by the separating mirror 22. The laser beams passing through the separating mirror 22, that is, the laser beam from the second semiconductor laser 62, is incided into the beam detector and are detected.

The beam detector 21 determines the timing of the start of modulation of each laser beams by the image date according to the timing of receiving the laser beams. The separating mirror 22 can advance or retreat with respect to the light path of laser beam. That is, the separating mirror 22 is supported rotatably around a supporting shaft 26 provided on one side thereof. To the supporting shaft 26, a lever 23 is installed and swinging the head end by advancing or retreating of a solenoid 24 allows the separating mirror 22 to advance or retreat with respect to the light path of laser beam. The evacuation movement of the separating mirror 22 is carried out to determine the modulation timing of the laser beam by allowing the beam detector 21 to receive the laser beam from the first semiconductor laser 61 when the second semiconductor laser 62 enters the trouble condition.

The first semiconductor laser 61 and the second semiconductor laser 62 independently generate laser beams modulated by the image data outputted from the print processing unit 40 in response to the red image and black image. The laser beams generated by both semiconductor lasers 61, 62 are composed by the composing mirror 63 and, then, deflected by the polygon mirror 65 which is rotated and driven by the polygon motor 64 so that it scan in the main scanning direction (line direction) on the photosensitive drum 71.

The laser beam deflected by the polygon mirror 65 is condensed by the condensing lens 69 to form images on the photosensitive drum 71 and deflected by the mirror 67a, and reaches to the separating mirror 68. The laser beam reaching the separating mirror 68 is separated into two laser beams, which are reflected by the mirrors 67b, 67c located in the respective light paths and reach each exposing position on the photosensitive drum 71, and expose the photosensitive drum 71.

The image forming system 70 develops the electrostatic latent image formed on the photosensitive drum 71, and transfers and fuses on the paper. This image forming system 70 consists of a develop/transfer system 70A, a carrying system 70B, and a fusing system 70C.

The develop/transfer system 70A consists of a photosensitive drum 71 driven and rotated in the arrow direction on FIG. 1, which is a counterclockwise direction, and several peripheral devices arranged around the drum 71.

That is, around the photosensitive drum 71, in order from the upstream side of the rotating direction, for the firs exposing, the scorotron type first static charger 72a which has a grid $72a_1$ charging the surface of the photosensitive drum 71 and the first developing device 73a which contains the red toner are arranged, and for the second exposing, the scorotron type second static charger $72b_1$ which charges the photosensitive drum 71 again and the second developing device 73b which contains the black toner are arranged. In addition, to the downstream side of the second exposing device 73b, a transfer charger which transfers the exposed toner image on the paper, a separating charger 75 which separates the paper from the photosensitive drum 71, a cleaning unit 76 which removes toner remaining on the photosensitive drum surface, and other peripheral devices are arranged.

To the first and second developing devices 73a, 73b, toner is fed by the toner bottle (not shown), to which a first and a second toner empty sensors 27a, 27b for detecting the toner empty condition are installed, respectively. Both the first and the second toner empty sensor 27a, 27b use a reflection type optical detectors and detect the existence of toner fed from the toner bottles. In this embodiment, these first and second toner empty sensors 27a, 27b detect the inoperable condition of the developing devices 73a, 73b.

In FIG. 1, the carrying system 70B supplies and carries the paper to the fusing system 70C. The fusing system 70B consists of cassettes 80a and 80b for containing the paper, a paper guide 81 for guiding the paper taken out from either one of these cassettes 80a and 80b, a timing roller 82 for adjusting the timing of carrying the paper guided by the paper guide 81 to the transferring portion between the transfer charger 74 and the photosensitive drum 71, and a carrying belt 83 for carrying the paper with toner images transferred to the fusing system 70C.

The fusing system 70C thermocompression-bonds the toner image transferred onto the paper with a pair of fusing rollers 84, 84. The paper with the toner fused by the fusing system 70C is discharged outside the copying machine by the discharge roller 85.

On the top surface of the copying machine, operation keys such as a print key 101 for starting the copying motion, a simultaneous two-color select key 102 for selecting the simultaneous two-color mode to form a two-color image with one copying motion, and a color select key 103 for selecting either black mono color mode or red mono color mode. A display unit (not shown) using LEDs for displaying the selected results by the abovementioned keys.

Figure 3:
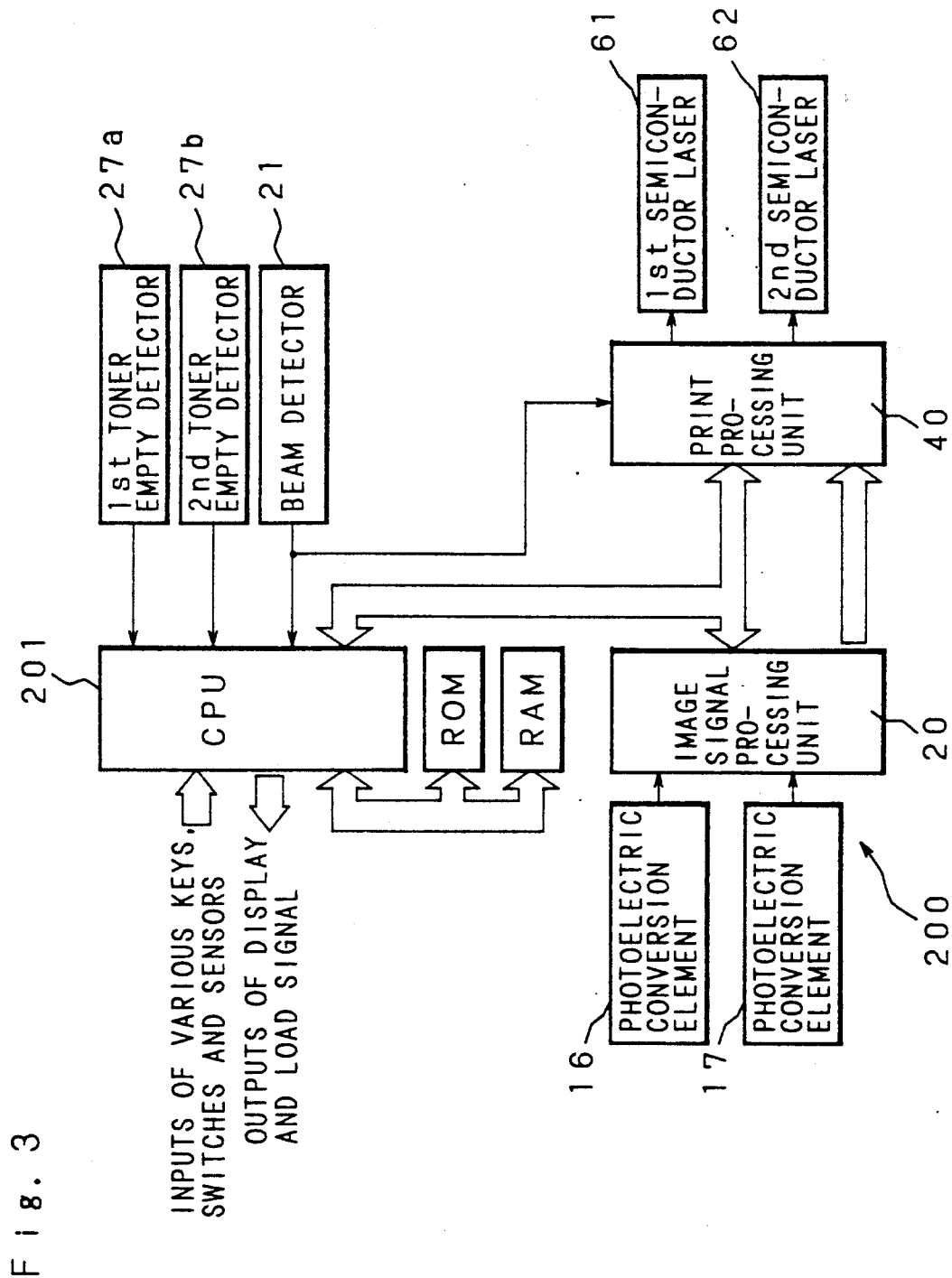
FIG. 3 is a block diagram showing a configuration of the main portion of the control system of a two-color copying machine as one embodiment of the multi-color image forming apparatus according to the present invention.

FIG. 3 is a block diagram showing a configuration of the main portion of the control system 200 of a copying machine according to the present invention. In this embodiment, the control system 200 is configured with the microcomputer (hereinafter called the "CPU") 201 as a control center.

To the CPU 201, various signals from the keys and switches such as the print key 101 and simultaneous two-color select key 102 and other signals are inputted. The CPU 201 analyzes the data as well as outputting the display signals and load signals in accordance with the various signals. The CPU inputs and outputs the data between the image signal processing unit 20 and the print processing unit 40 and carries out the control over the inputs and outputs.

The CPU 201 receives the detection signals from the beam detector 21 and, when it detects the signals, it instructs the print processing unit 40 to process the data of the subsequent one line. On the other hand, the print processing unit 40 receives the detection signal from the beam detector 21 and when it detects the signal, it outputs the modulation signals in accordance with the image data at a predetermined timing.

In addition, the CPU 201 outputs a mono-color density conversion signal to the print processing unit 40 in accordance with a predetermined conditions, when the toner empty signals are inputted from the first and second toner empty detectors 27a, 27b or laser trouble signals from a first and second semiconductor lasers 61, 62 later discussed. The CPU 201 outputs the first and the second laser use enable signals for enabling the use of the first semiconductor laser 61 and the second semiconductor laser 62 in accordance with the simultaneous tow-color select key 102, color select key 103, and first and second laser trouble signals to the print processing unit 40.

Figure 4:
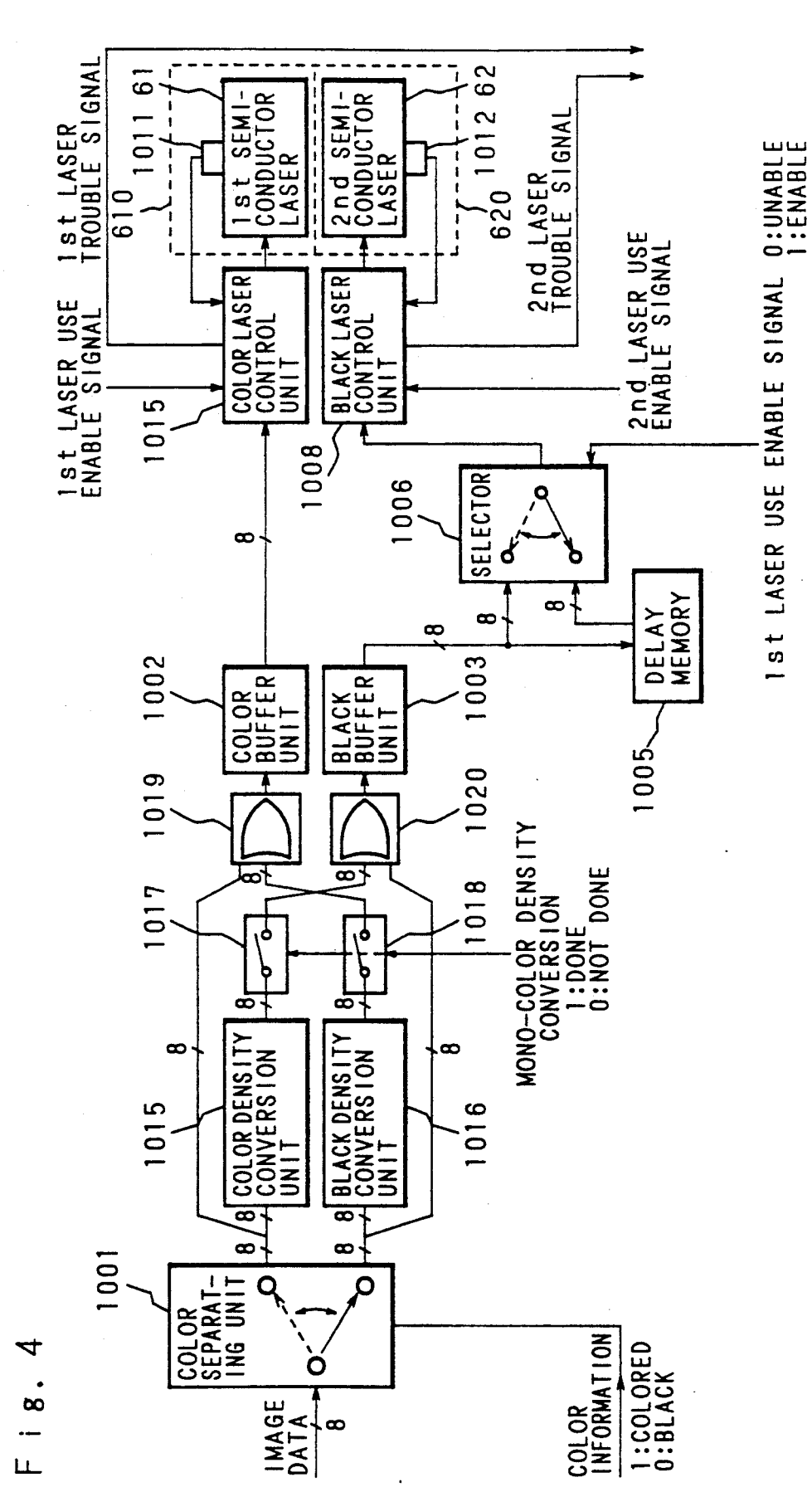
FIG. 4 is a block diagram showing a configuration of the print processing unit of a two-color copying machine as one embodiment of the multi-color image forming apparatus according to the present invention.

FIG. 4 is a block diagram showing a configuration of the print processing unit 40.

The image data having 8-bit density information given from the image signal processing unit 20 is sent to a color separating unit 1001. The color separating unit 1001 switches the output destinations in accordance with the color information attached to the input image data. The color information, for example, the signal value "1" shows the color and "0" black, respectively. Specifically, in the case where the color information is "1", the color separating unit 1001 is switched to the direction shown in the broken line in FIG. 4 and in the case where the color information in "0", the color separating unit 1001 is switched to the direction shown with the solid line in FIG. 4.

The image data outputted from the color separating unit 1001 is provided to the color density conversion unit 1015 and the one input terminal of the color OR circuit 1019 in the case where the color information is color ("1"), and to the black density conversion unit 1016 and the one input terminal of the black OR circuit 1020 in the case where the color information is block ("0").

Both the color density conversion unit 1015 and black density conversion unit 1016 use, for example, ROMs. These ROMs have one half of their density information stored in the address to be accessed by the 8-bit density information so that the input 8-bit density information is converted, for example, to one half of the density information.

In the case where the density is converted to one half as seen in the present embodiment, both density conversion units 1015, 1016 may be composed with the shift register to output the input density information with shifting one bit to the right.

The converted image data outputted from the color density conversion unit 1015 and black density conversion unit 1016 are inputted to other input terminals of the black OR circuit 1020 and the color OR circuit 1019 via respective switch circuits 1017, 1018.

Both OR circuits 1019, 1020 composes two image data by the logical sum of one of the color conversion image data and the image data before converting other colors, and with these data, the simultaneous two-color two-image data can be expressed as mono-color shading images. Both switch circuits 1017, 1018 turn on when the mono-color density conversion signal outputted from the CPU 201 is "1" and conversely, turn off when it is "0". In other word, both switch circuits 1017, 1018 convert density when the mono-color density conversion signal is "1", and do not convert density when it is "0". The outputs of the color OR circuit 1019 and black OR circuit 1020 are given to the color buffer unit 1002 and black buffer unit 1003, respectively.

The color buffer unit 1002 is used for synchronizing the color image data by one line and for adjusting the main scanning start timing. The image data outputted from this color buffer 1002 is provided to the color laser control 1007 which outputs the modulation signals according to the image data. The first semiconductor laser 61 is turned on and off by the modulation signals outputted by the color laser control 1007. The black buffer unit 1003 carries out the same processing related to the black image data. The image data outputted by this black buffer unit 1003 is provided to the delay memory 1005 and the selector 1006. The selector 1006 is also provided with the output of the delay memory 1005 and selects and outputs either the image data given by the black buffer unit 1003 or the image data given by the delay memory 1005.

In addition, the delay memory 1005 corrects the misalignment caused by the difference of exposing positions by two laser beams and delays the black image data by the time required for the photosensitive drum 71 to rotate between two exposing positions in the simultaneous two-color mode.

The selector 1006 selects the image data outputted from the black buffer unit 1003 when the first semiconductor laser 61 is inoperable, that is, when the first laser use enable signal is "0", and conversely, in the case where the first laser use enable signal is "1", the selector 1006 selects the output of the delay memory 1005. This is to set the copying machine to the high-speed mode for making the fast copy at a high speed in the black mono mode. In this high-speed mode, the selected image data is provided to the second semiconductor laser 62 via a black laser control unit 1008 same as the case described above.

To the first semiconductor laser 61 and the second semiconductor laser 62, a first current detector 1011 and the second current detector 1012 are provided integrally to detect the output current of the photo diode (not shown) which outputs the output current in accordance with the respective emitting rates. Specifically, the semiconductor laser 61 and the current detector 1011, and the semiconductor laser 62 and the current detector 1012 are formed on the same semiconductor substrate, respectively. The detected results of the output current of the first semiconductor laser 61 is given to the color laser control unit 1007 from the first current detector 1011, while those of the output current of the second semiconductor laser 62 is given to the color laser control unit 1008 from the second current detector 1012.

In the case where the detected results of the first current detector 1011 and the second current detector 1012 exceed the respective predetermined values, the color laser control unit 1007 and the black laser control unit 1008 send the CPU 201 the first and second laser trouble signals indicating that the first semiconductor laser 61 and the second semiconductor laser 62 fail, respectively.

The color and black laser control units 1007, 1008 are given the first and the second laser use enable signals from the CPU 201, respectively, which control the respective motions.

Figure 5:
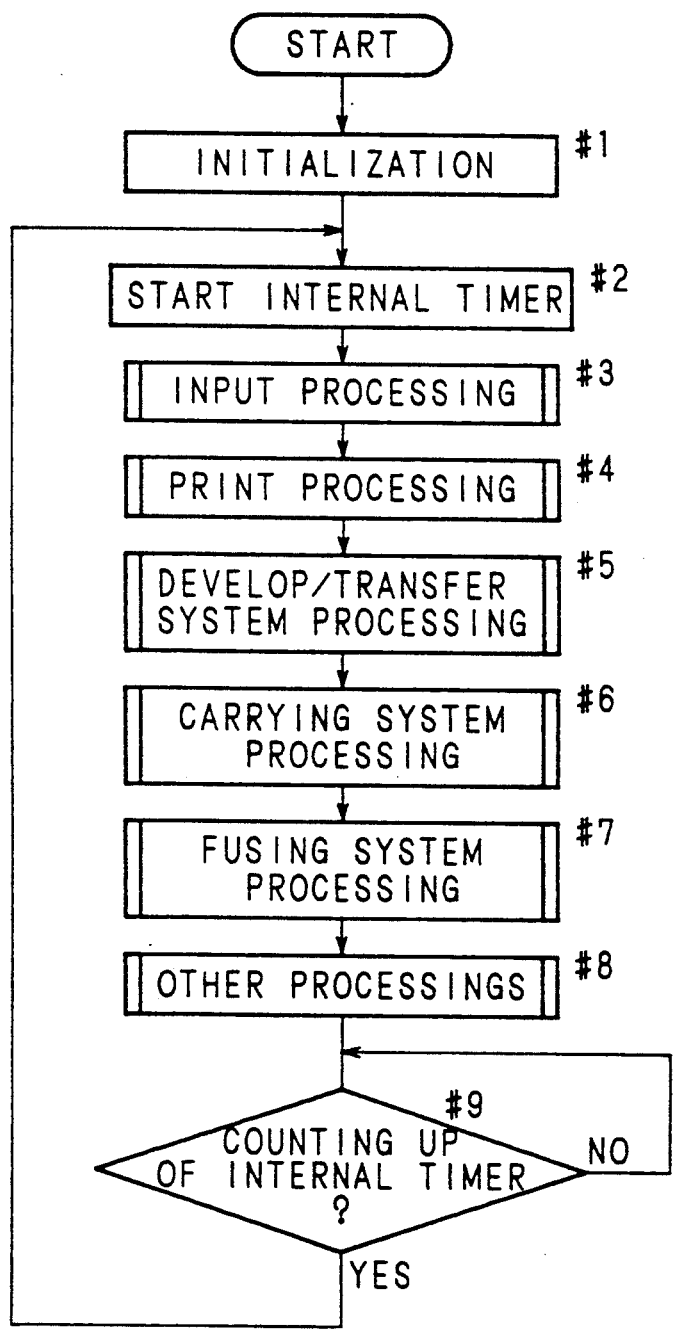
FIG. 5 is a flow chart showing the content of the main routine of the control system of a two-color copying machine as one embodiment of the multi-color image forming apparatus according to the present invention.

Next, description will be made on the operation of the control system 200. FIG. 5 is a flow chart showing the details of the main routine of the CPU 201.

As for the terms "on edge" and "off edge" used in the description of the following flow chart, "on edge" is defined as a change in the state of switches, sensors, and signals from off to on, while "off edge" is defined as a change in the state of switches, sensors, and signals from on to off.

In Step #1, turning on power, various timers, flags, counters, etc. used in the subsequent subroutines are initialized. The internal timer value which serves as a reference time for the subsequent processing is set and the internal timer is started (Step #2).

The subroutines are as follows. In the input processing subroutine (Step #3), inputs of various input switches and sensors are processed. In the print processing subroutine (Step #4), states of the first semiconductor laser 61, second semiconductor laser 62, and developing devices 73a, 73b are checked, and operable elements are selected and printing is controlled. In the develop/transfer system processing subroutine (Step

5), operating the developing device enabled to use in the print processing subroutine #4 causes the electrostatic latent image formed on the photosensitive drum 71 to be developed and transferred on the paper. In the carrying system processing subroutine (Step #6), paper is carried to the transferring portion. In the fusing system processing subroutine (Step #7), the paper with the transferred toner image is thermal-fixed. In the other processing subroutine (Step #8), other processing, such as receiving data from the scanning system 10, is carried out. When these subroutines are successively executed, the control system waits until the internal timer counts up (Step #9), then returns to the Step #2.

Figure 6A:
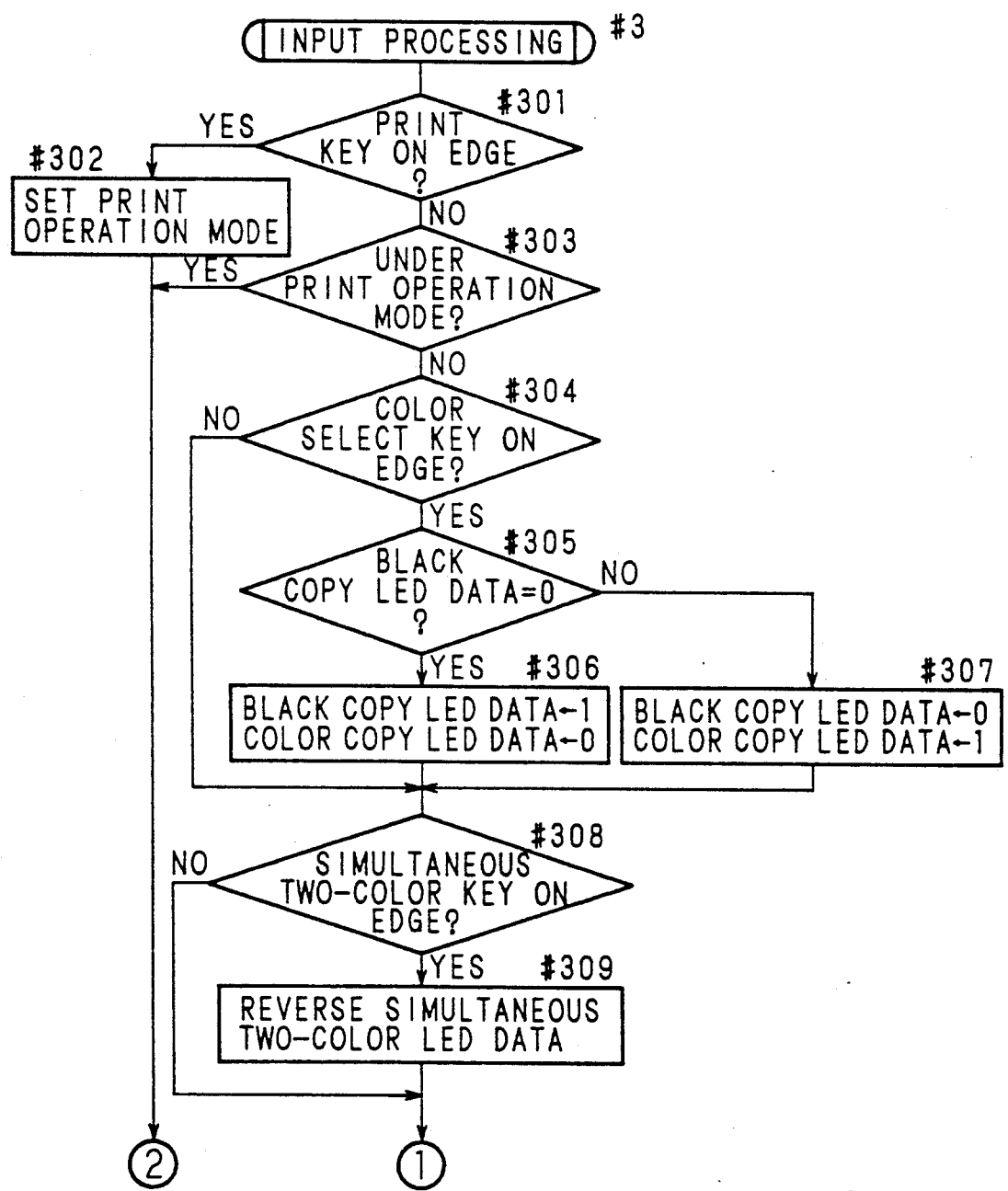
FIGS. 6A and 6B are a flow chart showing the processing content of the input processing sub routine of the control system of a two-color copying machine as one embodiment of the multi-color image forming apparatus according to the present invention.
Figure 6B:
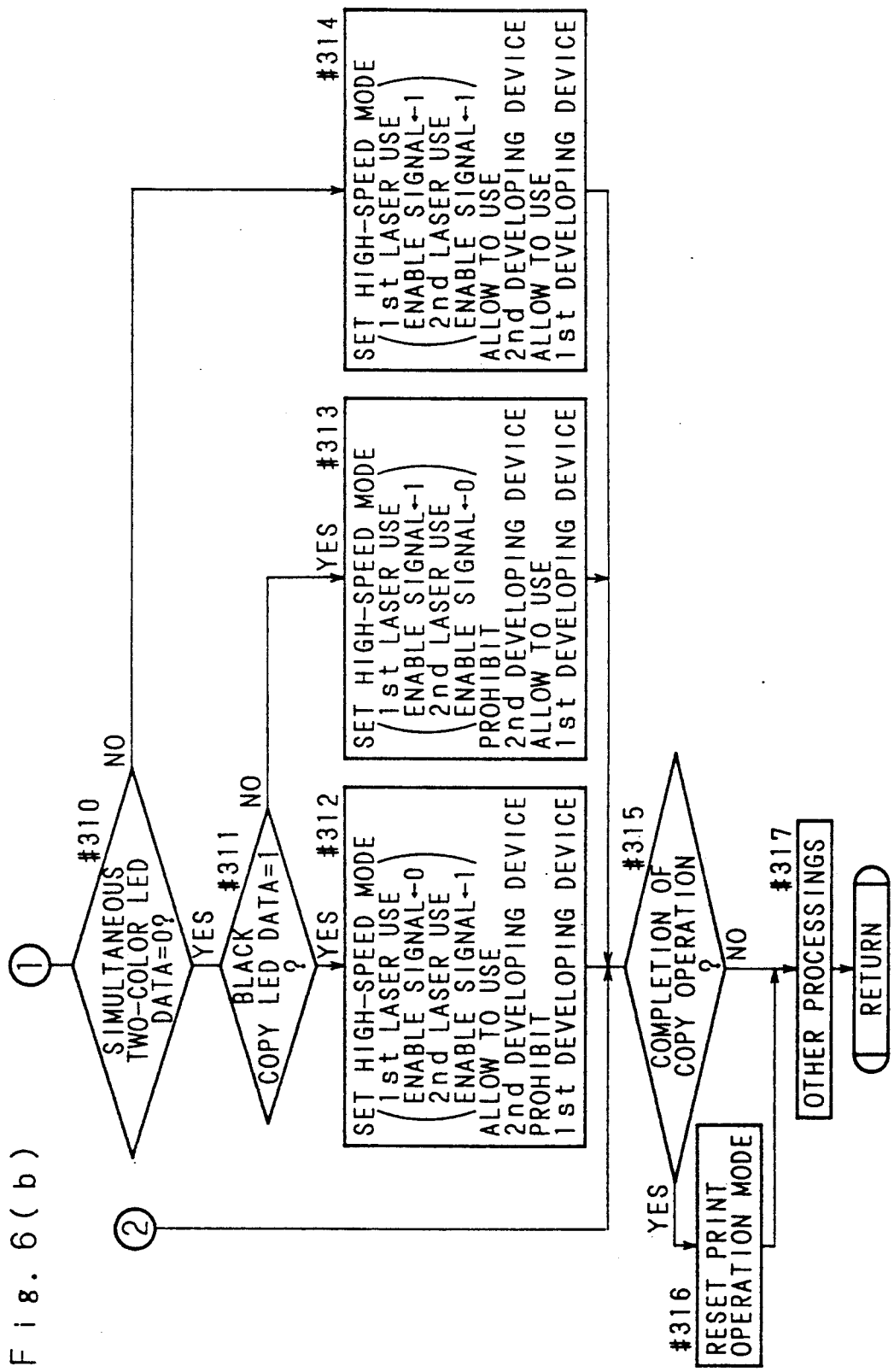

FIG. 6 is a flow chart showing the details of processing of the input processing subroutine of Step #3.

First of all, it is judged whether the print key 101 is on edge or not at Step #301. In the case where the print key 101 is on edge, the print operation flag is set (Step #302). In the case where the print key 101 is not on edge, the print operation mode flag is checked (Step #303) and in the case where this flag is set, that is, the system is in copying operation, the processing is jumped to Step #315 to prevent the input of the selection input of the developing devices 73a, 73b.

In the case where the system is not in printing operation at Step #303, it is judged whether the color select key 103 is on edge or not (Step #304). In the case where the color select key 103 is on edge, the black copy LED data is judged to be "0" or not (Step #305). As a result, in the case where the black copy LED data is "0", that is, the color copy is selected at this time, the black copy LED data is set to "1" and the color copy LED data is reset to "0" (Step #306). In the case where the black copy LED data is "1", conversely, the black copy LED data is reset to "0", and the color copy LED data is set to "1" (Step #307).

Then, at Step #308, it is judged whether the simultaneous two-color select key 102 is on edge or not. As a result, in the case where the simultaneous two-color select key 102 is on edge, the simultaneous two-color LED data is inverted, and in the case where the simultaneous two-color mode has been already selected, the mono-color mode is set, and in the case where the mono-color mode is selected, the simultaneous two-color mode is set (Step #309). In the case where the judgment result at Step #304 reveals that the color select key 103 is not on edge, the processing is proceeded to Step #308 and judges whether the simultaneous two-color select key 102 is on edge or not, and in the case where it is not on edge, the Step #309 is skipped.

Next, at Step #310, judgment is made on whether the simultaneous two-color LED data is "0" or not, that is, whether the system is under the mono mode or not. As a result, in the case where it is under the mono mode (judgment at Step #310 is YES), it is checked whether the black copy LED data is "1" or not (Step #311). As a result, in the case where black is selected (judgment at Step #311 is YES), the first laser use enable signal is set to "0" and the second laser use enable signal to "1" to set the high-speed mode, and the second developing device 73b for black 73b is then enabled to use and the first developing device 73a for the color is prohibited to use (Step #312). With this procedure, the black image data is sent to the black laser control unit 1008 with bypassing the delay memory 1005, thereby carrying out fast copy without delay.

In the case where the color is selected at Step #311 (judgment result at Step #311 is NO), conversely the first and second laser use enable signals are set to "1" and "0", respectively, and the second developing device 73b is prohibited to use and the first developing device 73a is allowed to use (Step #313). In the case where the it is judged to be under the simultaneous two-color mode in stead of the mono-color mode at Step #310 (judgment result at Step #310 is NO), the first and second laser use enable signals are both set to "1", allowing both first and second developing devices 73a, 73b to use, and the black image data is outputted via delay memory 1005 and the black image is aligned with the color image. At this time, both black copy LED data and color copy LED data are set to "1" to indicate that the simultaneous two-color mode is set.

Upon completion of these processing, the completion of copying operation is checked at Step #315 and in the case where the copying operation is not completed, the processing is returned to the main routine after carrying out other input processing at Step #317. In the case where the copying operation is completed, the print operation mode is reset (Step #316) and the processing is proceeded to Step #317.

Figure 7A:
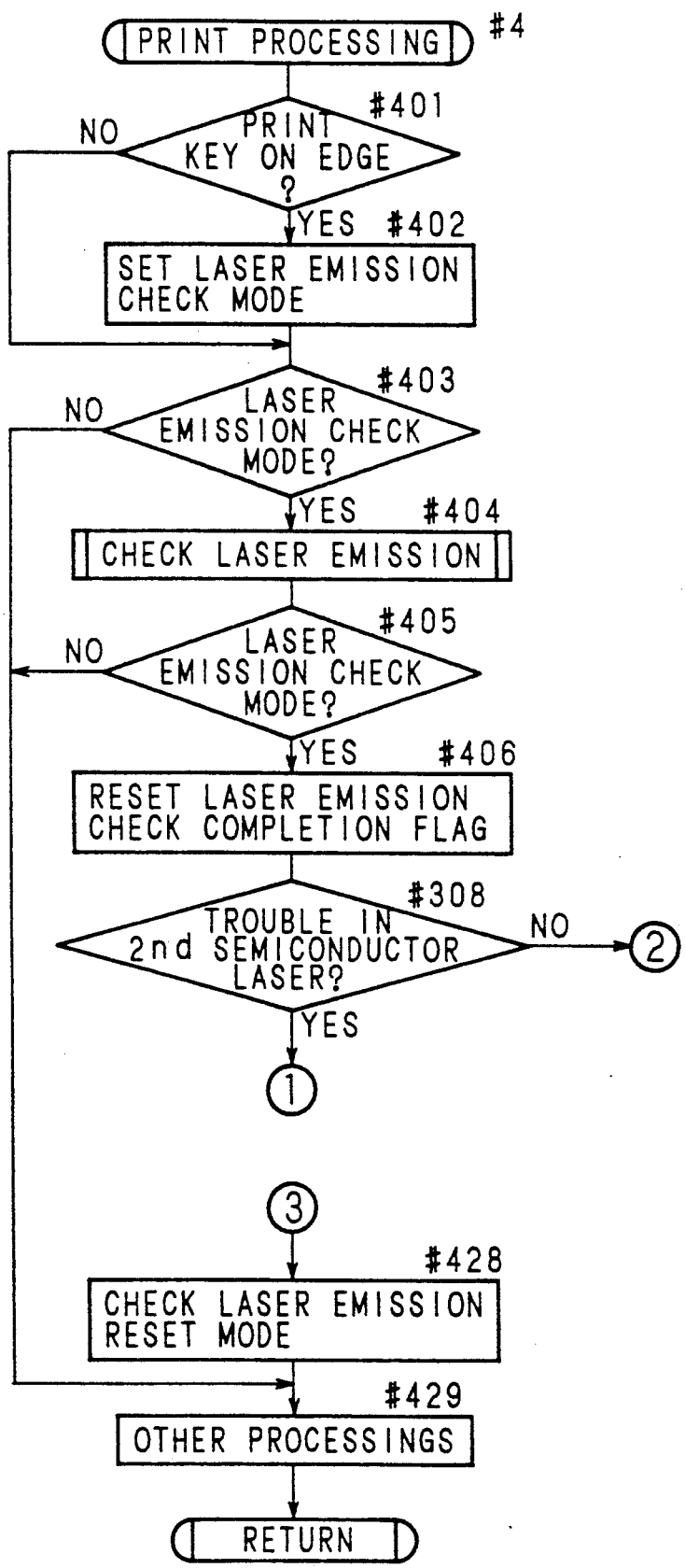
FIGS. 7A, 7B and 7C are a flow chart showing the processing content of the print processing sub routine of the control system of a two-color copying machine as one embodiment of the multi-color image forming apparatus according to the present invention.
Figure 7B:
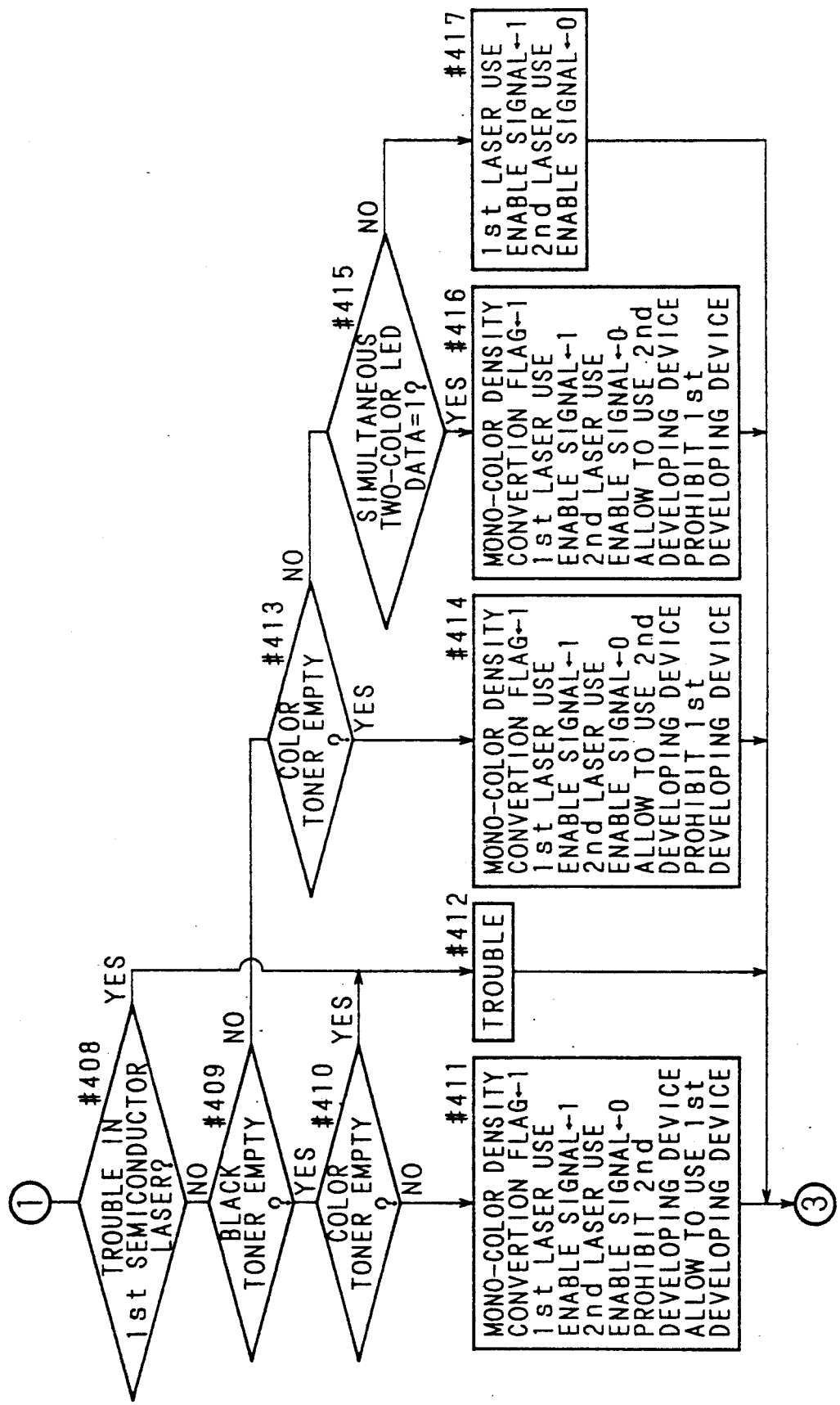
Figure 7C:
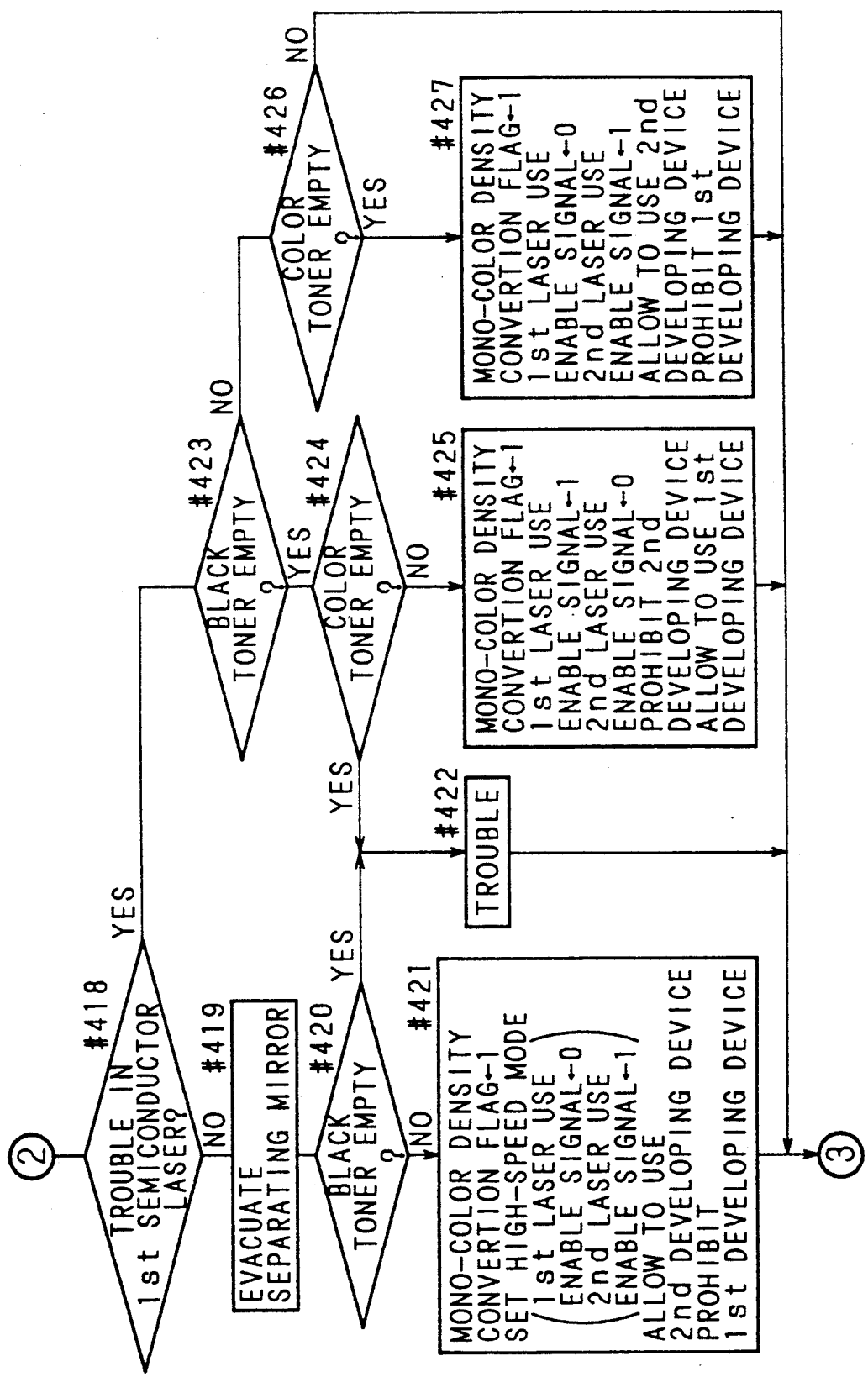

FIG. 7 shows the flow chart showing the processing details of the print processing subroutine of Step #4.

At Step #401, the print key 101 is checked for on edge, and in the case where it is on edge (judgment result at Step #401 is YES), the laser emission check mode is set (Step #402). Then, it is judged whether the laser emission check mode is set or not (Step #403), and in the case where it is set, the laser emission check subroutine processing is carried out (Step #404).

FIG. 8 is a flow chart showing the processing details of the laser emission check subroutine.

First of all, at Step #40401 the first semiconductor laser 61 and the second semiconductor 62 are forced to emit and let them wait for a predetermined time until emission stabilizes. It is judged whether the predetermined time has passed or not (Step #40402). In the case where a predetermined time passes (the judgment result at Step #40402 is YES), it is judged whether the detection results of output current by the first current detector 1011 of the first semiconductor laser 61 as described before exceeds a predetermined value or not (Step #40403).

In the case where the detection results of this output current exceeds a predetermined value (judgment results at Step #40403 is YES), the first semiconductor laser 61 is judged to be normal and the first laser trouble signal is reset (Step #40404). On the other hand, in the case where the detection result of output current is smaller than the predetermined value (judgment results at Step #40403 is NO), the first laser 61 is judged to be in the trouble state and the first laser trouble signal is set (Step #40405).

Then, it is judged whether the detection results of output current by the second current detector 1012 of the second semiconductor laser 62 as described before exceeds a predetermined value or not (Step #40406).

In the case where the detection results of this output current exceeds a predetermined value (judgment results at Step #40406 is YES), the second semiconductor laser 62 is judged to be normal and the second laser trouble signal is reset (Step #40407). On the other hand, in the case where the detection result of output current is smaller than the predetermined value (judgment results at Step #40406 is NO), the second laser 62 is judged to be in the trouble state and the second laser trouble signal is set (Step #40408).

Upon completion of this kind of laser emission check, the laser emission check completion flag is set (Step #40409), the first semiconductor laser 61 and the second semiconductor laser 62 are turned off (Step #40410), and the processing is returned to the print processing subroutine #4.

In the print processing subroutine of FIG. 7, upon completion of the laser emission check subroutine of Step #404, it is judged whether the laser emission check is taking place or not by judging whether the laser emission check completion flag is set or not (Step #405). In the case where the laser emission check completion flag is not set or the program is still checking laser emission (the judgment result at Step #405 is NO), the processing is processed to Step #425 and the other processing are carried out. The processing is also proceeded to Step #425 when the laser emission check mode is not set at Step #403. On the other hand, when the laser emission check completion flag is set (the judgment result at Step #405 is YES), the laser emission check completion flag is reset (Step #406) and according to troubles of the first and second semiconductor lasers 61, 62 and toner empty state detected by the first and second toner empty detectors 27a, 27b, processings are carried out in the subsequent routine.

When the second semiconductor laser 62 is in trouble state and the first semiconductor laser 61 is judged to be normal (the judgment result at Step #407 is YES and the judgment result at Step #408 is NO), even in the case where the second semiconductor laser 62 is in trouble and is inoperable, the image can be formed in the case where the first or the second developing device 73a, 73b is available, since the exposing position of the first semiconductor laser 61 is located upstream side of the first and the second exposing devices 73a, 73b. For this reason, availability of both developing devices 73a, 73b is judged by detection of toner empty state (Step #409, #410).

In the case where the second developing device 73b is unavailable due to toner empty, etc. and the first developing device 73a is available (the judgment result at Step #409 is YES and the judgment result at Step #410 is NO), by combining available first semiconductor laser 61 with the first developing device 73a, the developing density is varied and printing takes place in the pseudo two-color mode. For this printing, the mono-color density conversion flag is set, allowing the first semiconductor laser 61 to operate, prohibiting the second semiconductor laser 62 to operate, prohibiting the second developing device 73b to operate, and the first developing device 73a to operate (Step #411).

In the case where the simultaneous two-color is not predetermined in the input processing subroutine #3 shown in FIG. 6, the above-mentioned density conversion has no meaning. However, in the case where the simultaneous two-color is not predetermined, only one each of the semiconductor lasers and developing devices are used from the beginning and there is no data that requires a density change and no problem occurs at this point. In the case where both the second developing device 73b and the first developing device 73a are unavailable due to toner empty, etc. and both the first and the second semiconductor laser 61 and 62 are in trouble, printing is entirely impossible and it is displayed that trouble occurs (Step #412).

In the case where the second developing device 73b is available and the first developing device 73a is unavailable (the judgment result at Step #409 is NO and the judgment result at Step #413 is YES), by combining available first semiconductor laser 61 with the second developing device 73b, it is possible to carry out pseudo two-color mode printing with the density varied. For this printing, the mono-color density conversion flag is set, allowing the first semiconductor laser 61 to operate, prohibiting the second semiconductor laser 62 to operate, allowing the second developing device 73b to operate, and prohibiting the first developing device 73a to operate (Step #414).

In the case where both second developing device 73b and the first developing device 73a are available (the judgment result at Step #409 is NO and the judgment result at Step #413 is NO), it is judged whether the simultaneous two-color mode is directed or not (Step #415). In the case where the simultaneous two-color mode is directed (the judgment result at Step #415 is YES), the second developing device 73b is selected and pseudo two-color printing is carried out with the density varied. For this printing, the mono-color density conversion flag is set, allowing the first semiconductor laser 61 to operate, prohibiting the second semiconductor laser 62 to operate, allowing the second developing device 73b to operate, and prohibiting the first developing device 73a to operate (Step #416).

On the other hand, in the case where the simultaneous two-color is not selected (judgment result at Step #415 is NO), since the first semiconductor laser 61 located upstream side is available and both black and color developing devices 73a, 73b can be used, the first semiconductor laser 61 is allowed to operate and the second semiconductor laser 62 only is prohibited to operate, and no developing device to be used is specified and development takes place with the developing device selected by the input processing subroutine at Step #3.

Then, when judgment is made that the second semiconductor laser 62 is normal and the first semiconductor laser 61 is in trouble (judgment result at Step #407 is NO and that at Step #408 is YES), the solenoid 24 is operated to evacuate the separating mirror 22, thereby allowing the first semiconductor laser 61 to scan the beam detector 21 (Step #419). This is because the above-mentioned detection signal cannot be generated when trouble occurs in the second semiconductor laser 62 since the detection signal from the beam detector 21 is normally generated only by the second semiconductor laser 62.

Then, it is judged whether the second developing device 73b is available or not (Step #420). As a result, in the case where the second developing device 73b is available (judgment result at Step #419 is NO), by combining available second semiconductor laser 62 with the second developing device 73b, it is possible to carry out pseudo two-color mode printing with the density varied. For this printing, the mono-color density conversion flag is set, prohibiting the first semiconductor laser 61 to operate, allowing the second semiconductor laser 62 to operate, allowing the second developing device 73b to operate, and prohibiting the first developing device 73a to operate (Step #421). In this event, because the first semiconductor laser 61 is located at downstream side of the first developing device 73a, needless to say, the first developing device 73a is not be able to be used.

When the second developing device 73b is not be able to operate (judgment result at Step #420 is YES), printing is impossible and it is displayed that trouble occurs (Step #422).

On the other hand, in the case where the first semiconductor laser 61 and the second semiconductor laser 62 are both available (judgment results at Step #407 and #418 are both No), developing devices 73a, 73b are judged for availability. In the case where both second developing device 73b and first developing device 73a are not available (judgment results at Step #423 and #424 are both YES), printing is impossible and it is displayed that trouble occurs (Step #422).

When the second developing device 73b is unavailable and the first developing device 73a is available (judgment results at Step #423 is YES and that at #424 is NO), pseudo two-color printing is carried out with density varied by using the available first developing device 73a only. For this printing, the mono-color density conversion flag is set, allowing the first semiconductor laser 61 to operate, prohibiting the second semiconductor laser 62 to operate, prohibiting the second developing device 73b to operate, and allowing the first developing device 73a to operate (Step #425).

When the second developing device 73b is available and the first developing device 73a is unavailable (judgment results at Step #423 is NO and that at #426 is YES), pseudo two-color printing is carried out with density varied by using the available second developing device 73b only. For this printing, the mono-color density conversion flag is set, prohibiting the first semiconductor laser 61 to operate, allowing the second semiconductor laser 62 to operate, allowing the second developing device 73b to operate, and prohibiting the first developing device 73a to operate (Step #427).

Finally, when all of the first and the second semiconductor lasers 61, 62 and the first and the second developing devices 73a, 73b are normal and available, they can be used as set by the input processing subroutine #3 and the processing is proceeded to Step #424 as it is.

At Step #424, the laser emission check mode flag set at Step #402 is reset, and upon completion of other processing (Step #425), the processing is returned to the main routine.

FIG. 9 is a table summarizing the processing contents with respect to 16 combinations of conditions of the first and second semiconductor lasers 61, 62 and first and second developing devices 73a, 73b of the print processing subroutine.

In the above embodiment, eight combinations, one half of the 16 combinations, are brought into trouble condition and printing is made impossible. However, among the remaining eight combinations, seven combinations excepting the normal condition allow pseudo two-color printing by mono-color density conversion, producing copies with high visibility for emergency.

Figure 10:
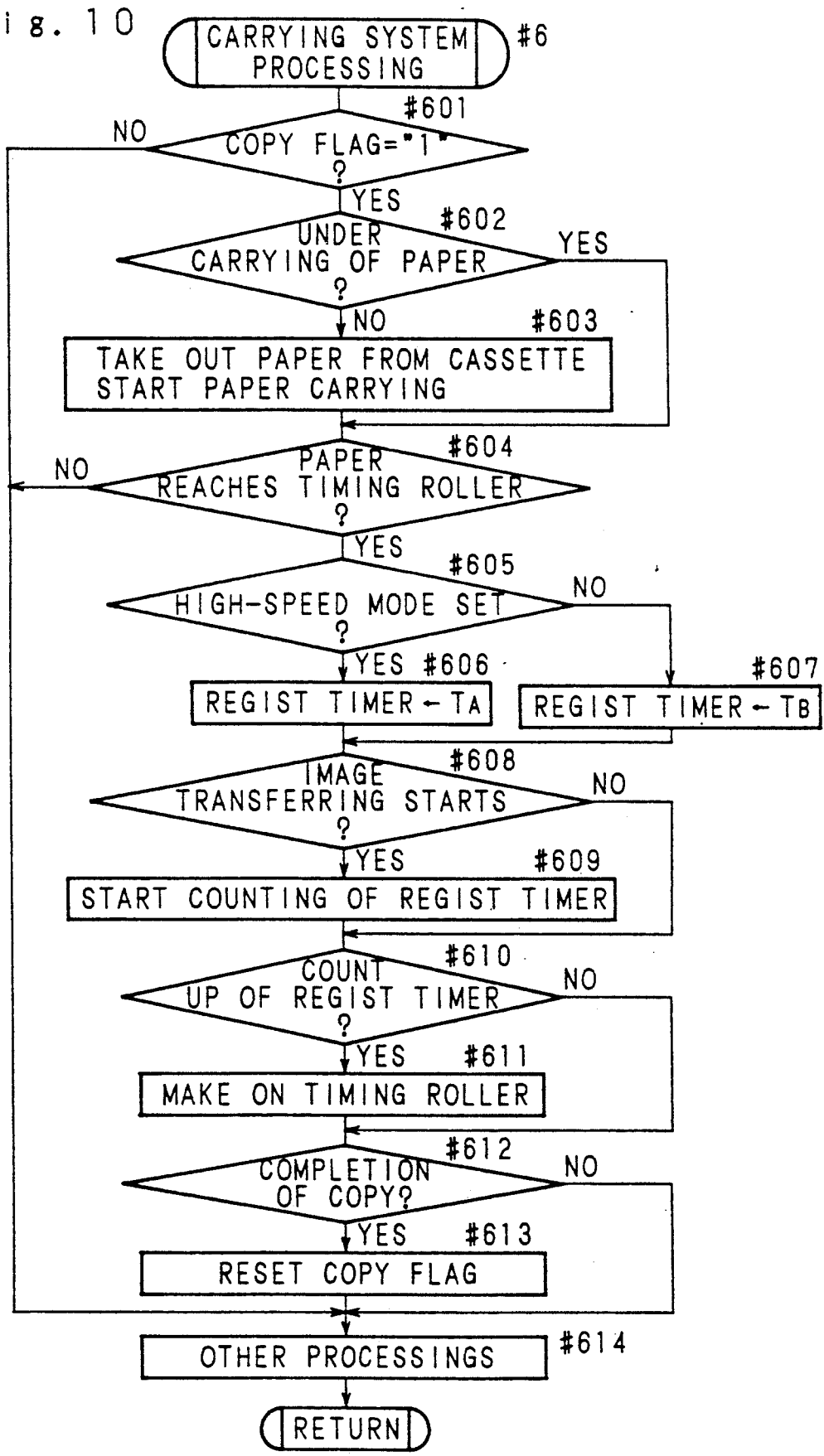
FIG. 10 is a flow chart showing the processing details of the carrying system processing routine of the control system of a two-color copying machine as one embodiment of the multi-color image forming apparatus according to the present invention.

FIG. 10 is a flow chart showing the processing details of the carrying system processing routine of Step #6.

First of all, it is judged whether the copy flag is "1" or not, that is, the system is in copying operation or not (Step #601), and in the case where in copying operation (judgment result at Step #601 is YES), it is judged whether the paper transfer is begun or not (Step #602). In the case where the paper transfer is not begun (judgment result at Step #602 is NO), the paper is taken out from either the cassette 80a or 80b selected by the cassette select button not shown and is started to be carried (Step #603) up to the position of the timing roller 82 (Step #604). Then, it is judged whether the high-speed mode information is set at Step #605 or not, that is, the fast copy is selected in the black mono mode or not.

Figure 11:
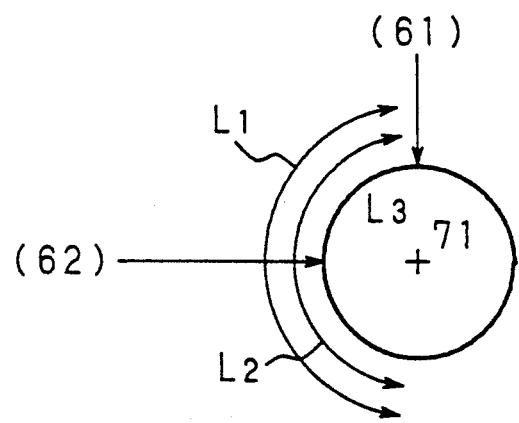
FIG. 11 is a schematic presentation showing the distance from exposing position of two laser beams to transfer portion on the photosensitive drum.

FIG. 11 is a schematic representation showing the distance from exposing position of two laser beams to transfer portion on the photosensitive drum 71.

On the photosensitive drum 71, $L_1$ denotes the distance from the position exposed with the laser beam from the first semiconductor laser 61 for a red image to the transfer portion, $L_2$ denotes the distance from the position exposed with the laser beam from the second semiconductor laser 62 for a clock image to the transfer portion, and $L_3$ ($=L_1-L_2$) denotes their difference.

In the case where the high-speed mode is set, the timer value $T_A$ in accordance with the time for the photosensitive drum 71 to move the distance $L_2$ is set to the regist timer, which determines the rotation start timing for the timing roller 82 (Step #606). On the other hand, in the case where the normal mode is set in place of the high-speed mode, the timer value $T_B$ in accordance with the time for the photosensitive drum 71 to move the distance $L_1$ is set to the regist timer (Step #607).

Then, it is judged whether the image transfer to the photosensitive drum 71 is begun or not (Step #608), and in the case where it is begun, the regist timer begins to count (Step #609) and the system waits until the set timer value $T_A$ or $T_B$ is counted up (Step #610). Upon completion of counting of the regist timer, the timing roller 82 turns on to rotate (Step #611) and the paper is fed to the transfer portion. With this procedure, the top end of the toner image formed on the photosensitive drum 71 is synchronized with that of the paper. When completion of copying motion is detected (judgment result at Step #612 is YES), the copy flag is reset (Step #613), and after other carrying processings are carried out (Step #614), the processing is returned to the main routine.

In the above-mentioned embodiment, a two-color copying machine was described as a multi-color image forming apparatus according to the present invention, but needless to say, the present invention can be applied to 3 or more color laser printers and digital copying machines.

In this embodiment, the unavailable condition of the developing device is detected by exhaustion of toners (toner empty), but the invention should not be limited to this but needless to say, various other conditions preventing development such as trouble in driving systems to rotate and drive sleeve rollers, etc. may be detected.

In this embodiment, in the optical system two beams are composed and separated, but the present invention should not be limited to this but the photosensitive body may be exposed without composing and separating the two beams. In such event, examples of troubles in the exposing means also include troubles in the polygon mirror driving system, etc.

In addition, in the above embodiment, an example to provide both the trouble detection means to detect troubles in the exposing means and the trouble detection means to detect inoperable condition of the developing means, respectively, is described but it is admitted to provide only either one of the detection means.

As described above, according to the present invention, in the case where any trouble occurs in the exposing means on the downstream side of the rotating direction of the photosensitive drum as an image support body, an image holding medium, exposure by the exposing means is taken over by the upstream exposing means to permit image forming.

When at least one of the two exposing means and two developing means is brought into trouble, density of the image data of the color in trouble is changed and the image data of the changed color and that of the other color are composed and the image can be formed with pseudo simultaneous color in trouble is changed and the image data of the two colors obtained by shading the other color. Consequently, even in the case where any trouble occurs in the exposing means or developing means, the apparatus can form an image for emergency, improving the image forming efficiency and resulting in excellent effects including producing images of high visibility when simultaneous two-color printing is used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A multi-color image forming apparatus, comprising:
    an image holding medium, being rotated in a predetermined direction, for holding electrostatic latent image formed thereon;
    light irradiating means, which has a plurality of light sources being disposed in the circumferential direction of said image holding medium and irradiating light including image information, for irradiating on a plurality of portions on said image holding medium to form respective electrostatic latent images in said respective portions;
    trouble detecting means for detecting light emission troubles caused in said plurality of light sources, respectively; and
    light irradiation controlling means,
    in the case where light emission trouble has not been detected by said trouble detecting means, for controlling said plurality of light sources to irradiate image informations which correspond to said plurality of light sources, respectively, and
    in the case where light emission trouble has been detected by said trouble detecting means, for controlling the light source in which trouble has been detected to be in non-operation state, and for controlling any of light sources in which trouble has not been detected to irradiate image information to have been irradiated by said light source in which trouble is detected.

2. A multi-color image forming apparatus as set forth in claim 1, wherein
    said light irradiation controlling means uses a light source which irradiates on a more upstream portion of the rotational direction of said image holding medium in the case where light emission trouble has been detected in any of said light sources.

3. A multi-color image forming apparatus as set forth in claim 2, further comprising:
    a plurality of developing means for developing a plurality of electrostatic latent images formed on said image holding medium by said light irradiating means.

4. A multi-color image forming apparatus as set forth in claim 2, wherein
    said trouble detecting means is incorporated with said light irradiating means.

5. A multi-color image forming apparatus, comprising:
    an image holding medium, being rotated in a predetermined direction, for holding electrostatic latent image formed thereon;
    a plurality of laser beam sources each of which, being disposed in the circumferential direction of said image holding medium, oscillates laser beams corresponding to image data;
    optical scanning means for scanning laser beam oscillated from said plurality of laser beam sources and irradiating it on a plurality portions of said image holding medium, respectively;
    a plurality of developing means, containing therein developers of different colors from each other, for developing electrostatic latent images, respectively formed on said image holding medium by said optical scanning means;
    trouble detecting means for detecting each oscillation trouble of said plurality of laser beam sources; and
    beam oscillation controlling means,
    in the case where oscillation trouble of said plurality of laser beam sources has not been detected by said oscillation trouble detecting means, for controlling said plurality of laser beam sources to actuate, and
    in the case where oscillation trouble has been detected in any of said plurality of laser beam sources by said oscillation trouble detecting means, for controlling the laser beam source not to actuate in which trouble has been detected, and for controlling any of laser beam source to actuate in which trouble has not been detected by said trouble detecting means inside the laser beam source which is one of the laser beam sources irradiating upstream side portions than the portion which is irradiated by said laser source in which trouble is detected in the direction of rotation of said image holding medium.

6. A multi-color image forming apparatus as set forth in claim 5, wherein
    at least one laser beam source of said plurality of laser beam sources oscillates laser beam of different wave length from that of other laser beam sources.

7. A multi-color image forming apparatus as set forth in claim 6, wherein
    said trouble detecting means is incorporated with said optical scanning means.

8. A multi-color image forming apparatus, comprising:
    an image holding medium for holding electrostatic latent image formed thereon;
    image exposing means, having a plurality of light sources each of which generates beam corresponding to image data of a predetermined color including density information, for irradiating a plurality of portions on said image holding medium, respectively to expose them;
    trouble detecting means for detecting each light emission trouble of said plurality of light sources;
    image data density changing means, in the case where trouble has been detected in any of said plurality of light sources by said trouble detecting means, for changing a density information of image data corresponding to the beam to be outputted from a light source to a density information of different density;

image data composing means for composing the image data whose density has been changed by said image data density changing means with image data corresponding to the beam outputted from a normal light source; and image forming means for forming an image using said normal light source on the basis of the image data composing by said image data composing means.

9. A multi-color image forming apparatus as set forth in claim 8, wherein said image data density changing means, having a memory in which density information to be changed is stored, for changing density information of an inputted image data to density information stored in said memory, and for outputting the changed image data.

10. A multi-color image forming apparatus as set forth in claim 9, wherein said image data composing means is provided with a logical circuit which carries out logical add operation of one image data of changed color and the other image data of unchanged color in order to compose said both image data.

11. A multi-color image forming apparatus as set forth in claim 8, wherein said image forming means includes a plurality of developing devices which, respectively contain developers of different colors from each other, and develops an electrostatic latent image formed on said image holding medium on the basis of said composed image data by using a developing devices having a desired color.

12. A multi-color image forming apparatus as set forth in claim 11, further comprising:

developing devices trouble detecting means for detecting generations of troubles in said plurality of developing devices, respectively.

13. A multi-color image forming apparatus as set forth in claim 12, wherein said trouble is toner empty state.

14. A multi-color image forming apparatus, comprising:

an image holding medium for holding an electrostatic latent image formed thereon;

image exposing means, having a plurality of light sources which generate beam corresponding to an image data of a predetermined color having density information, for forming, by irradiating on a plurality of portions on said image holding medium to expose, on the respective portions electrostatic latent images which correspond to respective colors;

a plurality of developing means, containing developers of different colors from each other, for developing a plurality of electrostatic latent images, respectively formed on said image holding medium by said image exposing means;

development trouble detecting means for detecting generations of troubles in said respective developing means;

image data density changing means, in the case where trouble is detected at least in one of said plurality of developing means by said trouble detecting means for changing a density information of an image data corresponding to the beam which forms electrostatic latent image to be developed by a developing means in which trouble has been detected;

image data composing means for composing an image data whose density has been changed by said density changing means of an image data with an image data whose density has not been changed; and image forming means for forming an electrostatic latent image on said image holding medium on the basis of an image data composed by said image data composing means and for making a developing means, in which trouble has not been detected by said development trouble detecting means, develop the formed electrostatic latent image.

15. A multi-color image forming apparatus as set forth in claim 14, wherein said image data density changing means having a memory in which density information to be changed is stored, for changing density information of an inputted image data to density information stored in said memory, and for outputting the changed image data.

16. A multi-color image forming apparatus as set forth in claim 15, wherein said image data composing means is provided with a logical circuit which carries out logical add operation of one image data of changed color and the other image data of unchanged color in order to compose said both image data.

17. A multi-color image forming apparatus as set forth in claim 14, wherein said trouble is the toner empty state.

18. A two-color image forming apparatus, comprising:

an image holding medium for holding electrostatic latent image formed thereon;

two exposing means for forming electrostatic latent images which correspond to two colors at different portions, by irradiating and exposing the two different portions in the circumferential direction of said image holding medium by means of two beams corresponding to image data of the two colors including density information;

light emission trouble detecting means for detecting respective light emission troubles of said two exposing means;

two developing means, containing developers of different colors from each other, for developing two electrostatic latent images formed on said image holding medium by said image exposing means;

development trouble detecting means for detecting generation of trouble in said two developing means, respectively;

image data density changing means, in the case where at least trouble of either one of exposing means or one of the two developing means has been detected by said light emission trouble detecting means or said development trouble detecting means for changing information of image data of a color corresponding to exposing means or developing means in which trouble has detected been to density information of another density;

image data composing means for composing image data whose density has been changed by said image data density changing means with image data whose density has not been changed; and image forming means for forming image by using said exposing means or said developing means which correspond to another color on the basis of image data composed by said image data composing means.

19. A two-color image forming apparatus as set forth in claim 18, wherein said image data density changing means, having a memory in which density information to be changed is stored, for changing density information of an inputted image data to density information stored in said memory, and for outputting the changed image data, and said image data composing means is provided with a logical circuit which carries out logical add operation of one image data of changed color and the other image data of unchanged color in order to compose said both image data.

20. A two-color image forming apparatus, comprising:

an image holding means, being rotated in a predetermined direction, for holding electrostatic latent image formed thereon;

two laser beam sources each of which beind disposed in the circumferential direction of said image holding medium, oscillates laser beams corresponding to image data;

optical scanning means for scanning laser beam oscillated from said two laser beam sources and irradiating it on two portions of said image holding medium, respectively;

two developing means, containing therein developers of different colors from each other, for developing two electrostatic latent images, respectively formed on said image holding medium by said optical scanning means;

trouble detecting means for detecting respective oscillation troubles of said two laser beam sources; and beam oscillation controlling means, in the case where oscillation trouble of said two of laser beam sources has not been detected by said oscillation trouble detecting means, for controlling said two laser beam sources to actuate, and in the case where oscillation trouble has been detected in one laser beam source which irradiate a portion at the downstream side in the rotational direction of said image holding means of said two laser beam sources and oscillation trouble has not been detected in other laser beam source which irradiate a portion at the upstream side in the rotational direction of said image holding means of said two laser beam sources by said oscillation trouble detecting means, for controlling said one laser beam source at downstream side not to actuate, and for controlling a laser beam source at upstream side to actuate.

21. A two-color image forming apparatus as set forth in claim 20, wherein said two laser beam sources oscillate respective laser beams of different wave lengths from each other.

22. A two-color image forming apparatus as set forth in claim 21, wherein said trouble detecting means is incorporated with said optical scanning means.

23. A two-color image forming apparatus, comprising:

an image holding medium, being rotated in a predetermined direction, for holding electrostatic latent image formed thereon;

exposing means, which includes a first light source outputting beam therefrom corresponding to image data of a first color and a second light source outputting beam therefrom corresponding to an image data of a second color, for forming at two portions, respectively electrostatic latent images corresponding to two colors by irradiating different portions of said image holding medium in the circumferential direction;

light emission trouble detecting means for detecting light emission trouble of said first and second light sources;

developing means including therein a first developing device which stores first developer of said first color and a second developing device which stores second developer of said second color, for developing two electrostatic latent images formed on said image holding medium by said first and second light sources;

mode selecting means for selecting a first mono-color mode forming an image of said first color by using said light source and said developing device corresponding to a first color, or for selecting a second mono-color mode forming an image of said second color by using said light source and said developing device corresponding to a second color, or for selecting two-color mode forming image of two color by using said exposing means and said developing means during one operation of forming image; and image data processing means, in the case where said two-color mode is selected by said mode selecting means and trouble has not been detected by said light emission trouble detecting means, for changing a density information of image data of one color corresponding to beam to be outputted from the light source in which trouble has been detected to a density information of another density, and for composing the image data whose density information has been changed with the image data of another color to output the composed image data.

24. A two-color image forming apparatus as set forth in claim 23, wherein said image data processing means including a logical circuit and a memory which stores density information to be changed, for changing an inputted density information of an image data to a stored density information, and for carrying out logical-add operation of said data of one color whose density information has been changed and the image data of another color whose density has not been changed to composing said both image data.

25. A two-color image forming apparatus as set forth in claim 23, further comprising:

development trouble detecting means for detecting generation of trouble at respective said first and second developing devices.

26. A two-color image forming apparatus as set forth in claim 23, image forming executing means for executing image forming operation corresponding to a mode selected by said mode selecting means and for operating a developing device in which trouble has not been detected by said development trouble detecting means on the basis of said composed data outputted from said image data processing means.

27. A two-color image forming apparatus, comprising:

an image holding medium, being rotated in a predetermined direction, for holding electrostatic latent image formed thereon;

exposing means, which includes a first light source outputting beam therefrom corresponding to image data of a first color and a second light source outputting beam therefrom corresponding to an image data of a second color, for forming at two portions, respectively electrostatic latent images corresponding to two colors by irradiating different portions of said image holding medium in the circumferential direction;

light emission trouble detecting means for detecting light emission trouble of said first and second light sources;

developing means including therein a first developing device which stores first developer of said first color and a second developing device which stores second developer of said second color, for developing two electrostatic latent images formed on said image holding medium by said first and second light sources;

mode selecting means for selecting a first mono-color mode forming an image of said first color by using said light source and said developing device corresponding to a first color, or for selecting a second mono-color mode forming an image of said second color by using said light source and said developing device corresponding to a second color, or for selecting two-color mode forming image of two color by using said exposing means and said developing means during one operation of forming image; and an image data processing means for outputting an image data of one color corresponding to beam to be outputted from said laser beam source at the downstream side from another laser beam source, in the case where either of said mono-color modes has been selected by said mode selecting means, and has been detected at the laser beam source irradiating a portion at the downstream side in the rotational direction of said holding means inside of said two laser beam sources and light emission trouble has not been detected at the laser beam source irradiating a portion at the upstream side in the rotational direction of said holding means.

28. A two-color image forming apparatus, comprising:

an image holding medium, being rotated in a predetermined direction, for holding electrostatic latent image formed thereon;

exposing means, which includes a first light source outputting beam therefrom corresponding to image data of a first color and a second light source outputting beam therefrom corresponding to an image data of a second color, for forming at two portions, respectively electrostatic latent images corresponding to two colors by irradiating different portions of said image holding medium in the circumferential direction;

light emission trouble detecting means for detecting light emission trouble of said first and second light sources;

developing means including therein a first developing device which stores first developer of said first color and a second developing device which stores second developer of said second color, for developing two electrostatic latent images formed on said image holding medium by said first and second light sources;

mode selecting means for selecting a first mono-color mode forming an image of said first color by using said light source and said developing device corresponding to a first color, or for selecting a second mono-color mode forming an image of said second color by using said light source and said developing device corresponding to a second color, or for selecting two-color mode forming image of two color by using said exposing means and said developing means during one operation of forming image; and image data processing means, in the case where said two color modes are selected by said mode selecting means and trouble has been detected by said light emission trouble detecting means, for changing a density information of an image data of one color corresponding to beam to be outputted from one light source in which trouble has been detected to a density information of another density, and for composing the image data whose density information has been changed with the image data of another color to output the composed image data, and in the case where either of said mono-color mode has been selected by said mode selecting means, and light emission trouble has been detected at the laser beam source irradiating a portion at the downstream side in the rotational direction of said holding medium inside of said two laser beam sources by said light emission trouble detecting means and light emission trouble has not been detected at the laser beam source irradiating a portion at the upstream side in the rotational direction of said holding means by the same, for outputting an image data of one color corresponding to beam to be outputted from said laser beam source at downstream side from another laser beam source.

* * * * *